United States Patent [19]

Armstrong

[11] Patent Number: 4,627,077
[45] Date of Patent: Dec. 2, 1986

[54] MODIFIED QAM DATA POINT CONSTELLATION FOR SECONDARY CHANNEL SIGNALLING

[75] Inventor: Thomas R. Armstrong, Clearwater, Fla.

[73] Assignee: Paradyne Corporation, Largo, Fla.

[21] Appl. No.: 677,509

[22] Filed: Dec. 3, 1984

Related U.S. Application Data

[63] Continuation-in-part of Ser. No. 533,886, Sep. 20, 1983, abandoned, which is a continuation of Ser. No. 299,664, Sep. 8, 1981, abandoned.

[51] Int. Cl.[4] .................. H03C 5/00; H04L 27/00
[52] U.S. Cl. ......................... 375/39; 370/110.4; 332/10
[58] Field of Search ............ 375/38, 39, 42, 58, 375/67; 332/9 R, 10, 17; 370/11, 12, 20, 37, 110.1, 110.4, 119; 329/135

[56] References Cited

U.S. PATENT DOCUMENTS

| | | | |
|---|---|---|---|
| 3,718,766 | 2/1973 | Stover | 370/11 |
| 3,955,141 | 5/1976 | Lyon et al. | 375/39 |
| 4,227,152 | 10/1980 | Godard et al. | 375/39 |
| 4,271,509 | 6/1981 | Brolin | 370/110.1 |
| 4,347,616 | 8/1982 | Murakami | 375/39 |
| 4,389,722 | 6/1983 | Hofmeister | 375/39 |
| 4,442,530 | 4/1984 | Parrish, Jr. et al. | 375/39 |

Primary Examiner—Benedict V. Safourek
Attorney, Agent, or Firm—Kane, Dalsimer, Kane, Sullivan & Kurucz

[57] ABSTRACT

A method of adding a secondary channel to a QAM signal mapped in the complex plane is provided. A pair of positions in the mapped complex plane is determined such that the positions are equi-distant from the origin and no greater from the origin than the distance from the origin to the position of the furthest mapped data point. For secondary channel communication, a data point is shifted from a normal mapped position to one or the other of the new positions with one of said positions assuming a binary "1" for the secondary channel and the other of said positions assuming a binary "0".

5 Claims, 4 Drawing Figures

NORMAL 64 POINT CONSTELLATION

MODIFIED QAM DATA POINT CONSTELLATION FOR SECONDARY CHANNEL SIGNALLING

This is a continuation-in-part application to application Ser. No. 533,886 filed Sept. 20, 1983 now abandoned, which was a continuation of patent application Ser. No. 299,664 filed Sept. 8, 1981, now abandoned.

BACKGROUND OF THE INVENTION

The present invention relates to data transmission and in particular to an improved signal structure for transmitting a secondary channel in a quadrature amplitude modulation (QAM) constellation.

In U.S. Pat. No. 3,887,768 issued June 3, 1975 to Formey, Jr. et al. for SIGNAL STRUCTURES FOR DOUBLE SIDE BAND QUADRATURE CARRIER MODULATION, a data transmission system is described in which the signal points are mapped in the complex plane on concentric rings. The signal point of each ring is rotated by 45° from those of the next adjacent ring and no point is allowed at the origin. Such signal constellations are widely used in data transmission systems.

To increase the data carrying capabilities of such transmissions systems, it has heretofore been proposed to introduce a secondary channel to the primary channel QAM signal. The problem is to introduce the secondary channel with no degradation of the primary channel and with no substantial variation in the power requirements of the transmission system when the secondary channel is utilized. Heretofore it is has been proposed to introduce the secondary channel by shifting the angular position of the data points. Thus, when the data points assume a first position, a binary "1" is transmitted for the secondary channel and when the data points assume a secondary position, angularly shifted with respect to the first position, a binary "0" is transmitted for the secondary channel. The problem with this procedure is that it significantly reduces or degrades the performance of the primary QAM channel.

In view of the above, it is the principal object of the present invention to provide an improved system for the transmission of secondary channel signalling in a QAM constellation.

A further object of the present invention is to provide such a system which introduces virtually no degradation to the primary channel.

A still further object is to provide such a system in which the secondary channel may be added without any additional power requirements over that of the primary QAM channel.

A still further object is to provide such a system wherein the secondary channel may be asynchronous.

Still other objects and advantages will be self-evident from the following.

SUMMARY OF THE INVENTION

The above and other beneficial objects and advantages are attained in accordance with the present invention by providing a QAM signal mapped in the complex plane with a data point shiftable from its normal position to one of two new positions. The new positions are chosen so as to be equi-distant from the origin and no further from the origin than the normal position of the data point. Preferably the data point chosen to be shifted is that furthest from the origin so that shifting to either of the new position results in a power savings. A binary "1" is assigned to one of the pair of positions and a binary "0" is assigned to the other of the pair of positions. Transmission on the secondary channel results from shifting the data point between the two new positions depending on the data value being transmitted. Secondary channel transmission may thus be attained without any degradation of the primary channel signal.

DETAILED DESCRIPTION OF THE PREFERRED EMBODIMENT

Figure 1:
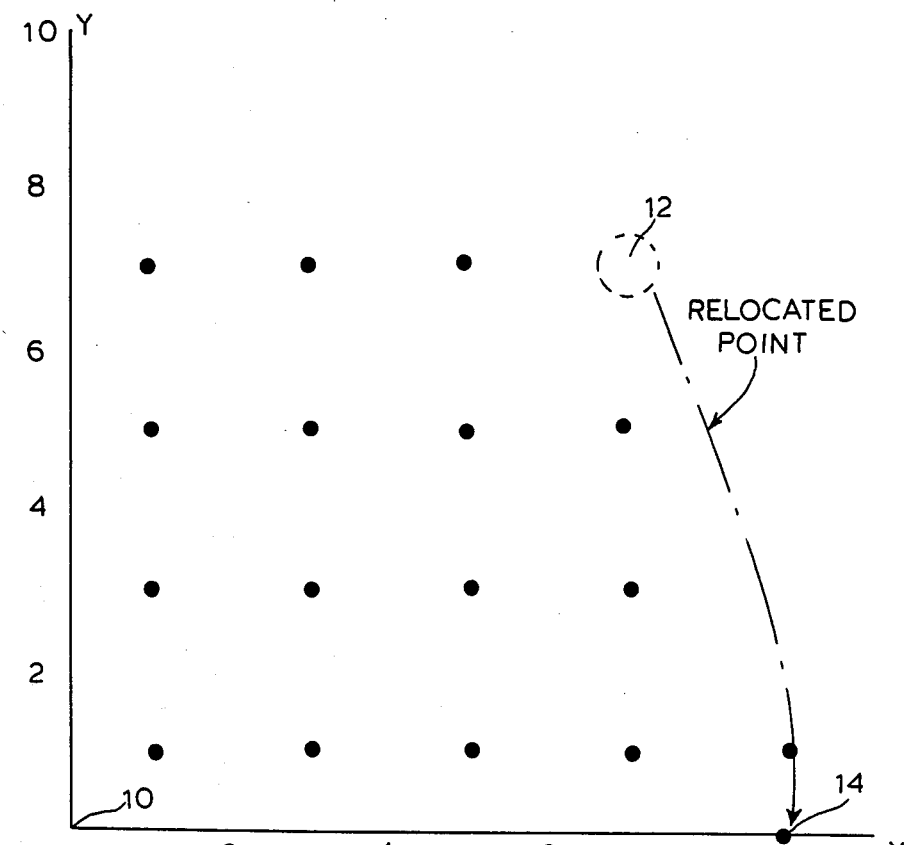
FIG. 1 depicts one quadrant of a normal 64 point data constellation.

Reference is now made to the drawings and to FIG. 1 in particular wherein one quadrant of a 64 point constellation for a QAM signal mapped in the complex plane is shown. In accordance with such mapping, the origin is unoccupied and the remaining data points are disposed on concentric rings. For reasons which are described in detailed in my recently issued U.S. Pat. No. 4,271,527 entitled DOUBLE SIDE BAND-QUADRATURE CARRIER MODULATION SIGNAL STRUCTURE, the maximum power requirement for such a constellation is a function of the distance from the origin 10 to the furthest mapped position 12 which is (7,7). The above mentioned patent also discusses the method and reason for shifting the data point from position (7,7) to (9,1) which results in a reduction of peak voltage squared in the ratio of 24.5 to 20.5. It should be apparent that the same peak voltage squared reduction would result if the data point was shifted to (9,−1) or (1,9). A slightly greater voltage reduction occurs if the data point is shifted to (9,0).

Figure 2:
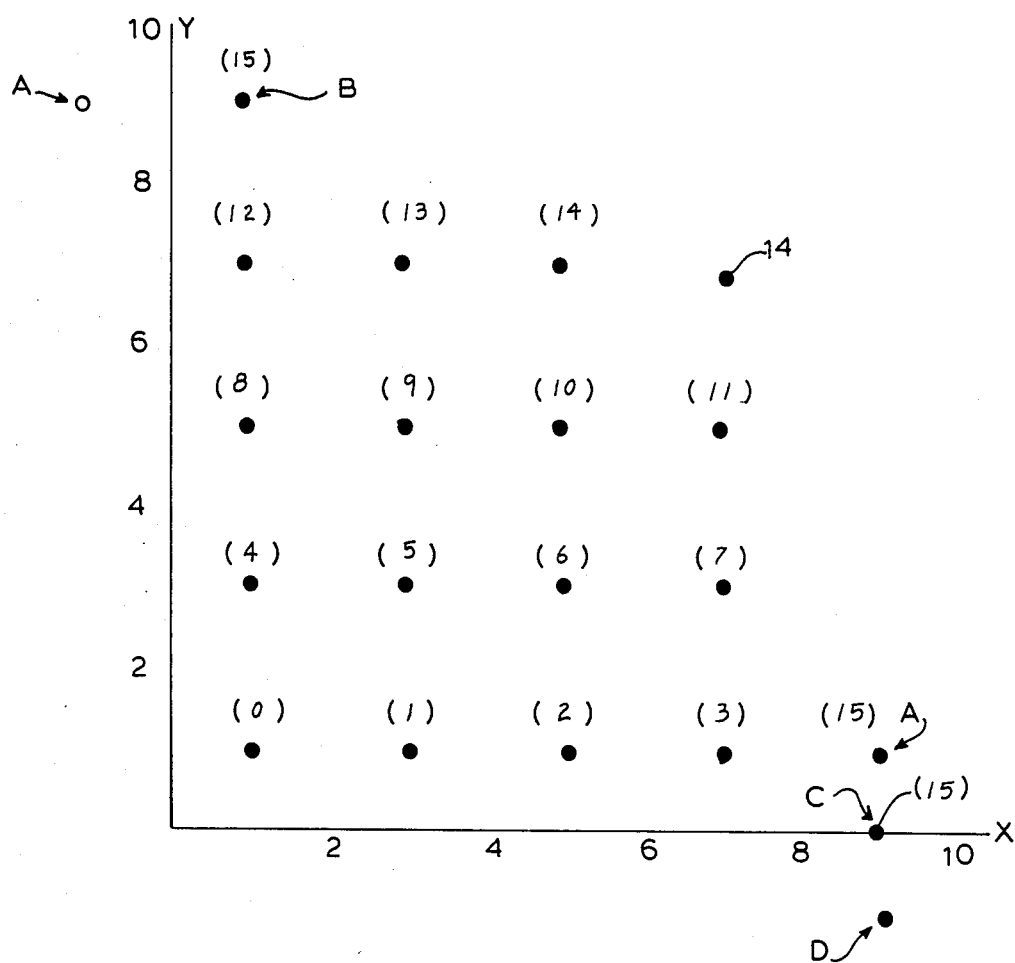
FIG. 2 depicts the same quadrant as FIG. 1 with the possible new positions of data point to be shifted.

In accordance with the present invention, a secondary channel in introduced by virtue of a mapped data point 14 selecting one of two assigned positions, A or B both of which are equi-distant from the origin and closer to the origin than the normal position of data point 14 in the mapped constellation. Thus, when data point 14 is located as shown in FIG. 1, only primary channel transmission occurs. In accordance with my previously mentioned U.S. Pat. No. 4,271,527 it is desirable to shift data point (7,7) to (9,0) to conserve power. Thus, when data point (7,7) is at its normal position or shifted to (9,0) only primary channel transmission occurs. However, in accordance with the present invention, shifting of the data point 12 to assume either of positions A or B (as shown in FIG. 2) results in secondary channel transmission. To this end, one of data point positions is assigned a binary "1" and the other of the positions is assigned a binary "0". If, for example, position A is assigned a binary "1" and position B a binary "0" then, data point 14 assuming the position A would result in the transmission of a "1" on the secondary channel and data point 14 assuming the position B would result in the transmission of a binary "0" on the secondary channel.

By locating data point positions A and B such that they are equi-distant from the origin and no further from the origin than the original position of data point 14, the power requirement for the data point 14 assuming position A or B will be the same regardless of whether a binary "1" or "0" is transmitted over the secondary channel and substantially less than the power requirement for the unshifted point. Of course, if an increase in the power requirement can be tolerated the points A and B may be further from the origin than the original position of the data point 14 although the points A and B must still be equi-distant from the origin.

Thus, in accordance with the above, the aforementioned objectives are effectively attained.

Modems for transmitting and receiving quadrature-amplitude modulated signals are well known in the art. For example, in U.S. Pat. No. 3,955,141, granted on May 4, 1976, to Lyon et al, a modem is described for handling time-multiplexed signals. In order to insure the proper demultiplexing of these signals, the transmitter and receiver are synchronized by changing the positions of a number preselected signal constellation points. These constellation points are shifted by the transmitter in response to an internally-generated frame signal.

Figure 3:
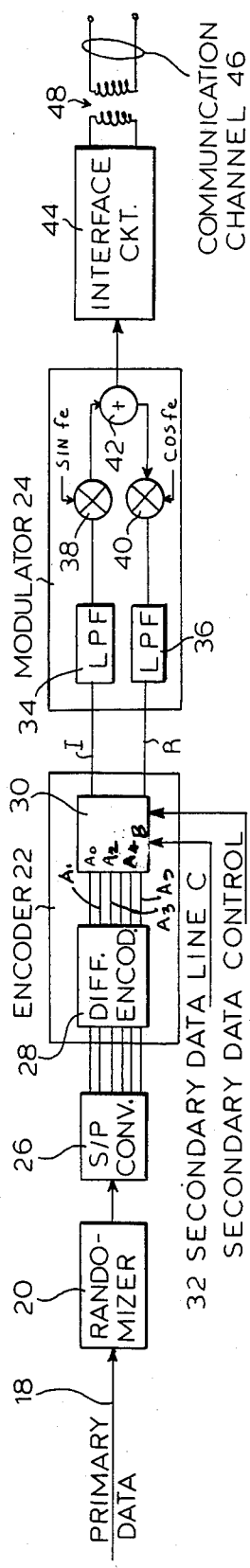
FIG. 3 shows a transmitter for transmitting the signals of FIG. 2.

A modem similar to the one described by Lyon et al in the above mentioned U.S. Pat. No. 3,955,141 may be used to transmit a modified QAM data point constellation for secondary channel signaling as follows. The transmitter, as shown in FIG. 3, comprises a randomizer 20, an encoder 22 and a modulator 24. The input bits from a primary data line 18, i.e., the primary data, are fed into a randomizer which scrambles them in a pseudo-random fashion. The scrambled data bits are then fed to encoder 22 through a serial-to-parallel converter 26. The encoder is provided to generate the real and imaginary signals R and I which define the signal constellation points corresponding to a preselected number of data bits from randomizer 20. The number of output parallel lines from converter 26 depends on the particular encoding scheme used. For a 64 point signal constellation, 6 lines are necessary. Encoder 22 may include a differential encoder 28 for differentially encoding the bits in the normal manner. From encoder 28 the binary bits are then fed to a coordinate signal generator 30. The coordinate signal generator is adapted to generate the R and I signals in accordance with a preselected encoding scheme. The coordinate signal generator 30 also receives a secondary data control signal which, when enabled forces the signal generator to change its signal constellation in accordance with binary signals from a second data line 32. For example, if the primary input lines to generator 30, comprise lines $A_0$, $A_1$, $A_2$, $A_3$ and secondary line B, then the corresponding output signals R and I may be defined as shown in Table 1 to generate the first quadrant signal constellation points of FIG. 2. The remaining two primary lines $A_4$ and $A_5$ to generator 30 determine the quadrant of the signal constellation.

TABLE 1

| $A_0$ | $A_1$ | $A_2$ | $A_3$ | B | OUTPUTS R | I |
|---|---|---|---|---|---|---|
| 0 | 0 | 0 | 0 | X | 1 | 1 |
| 0 | 0 | 0 | 1 | X | 3 | 1 |
| 0 | 0 | 1 | 0 | X | 5 | 1 |
| 0 | 0 | 1 | 1 | X | 7 | 1 |
| 0 | 1 | 0 | 0 | X | 1 | 3 |
| 0 | 1 | 0 | 1 | X | 3 | 3 |
| 0 | 1 | 1 | 0 | X | 5 | 3 |
| 0 | 1 | 1 | 1 | X | 7 | 3 |

TABLE 1-continued

| $A_0$ | $A_1$ | $A_2$ | $A_3$ | B | OUTPUTS R | I |
|---|---|---|---|---|---|---|
| 1 | 0 | 0 | 0 | X | 1 | 5 |
| 1 | 0 | 0 | 1 | X | 3 | 5 |
| 1 | 0 | 1 | 0 | X | 5 | 5 |
| 1 | 0 | 1 | 1 | X | 7 | 5 |
| 1 | 1 | 0 | 0 | X | 1 | 7 |
| 1 | 1 | 0 | 1 | X | 3 | 7 |
| 1 | 1 | 1 | 0 | X | 5 | 7 |
| 1 | 1 | 1 | 1 | NONE | 0 | 9 |
| 1 | 1 | 1 | 1 | 0 | 9 | 1 |
| 1 | 1 | 1 | 1 | 1 | 1 | 9 |

X = DON'T CARE

The decimal equivalent of each binary word $A_0$, $A_1$, $A_2$, $A_3$ is shown in FIG. 2 in parenthesis. It can be seen from this Table, that except for primary input 1111 the generator outputs are not affected by the secondary control signal and the binary data. For 1111, if the secondary control signal is disabled, point C (0, 9) is selected. If the binary control signal is enabled, then generator 30 selects either point A (1, 9) or point B (9, 1) in response to primary input 1111 depending in whether the secondary binary data signal is a "1" or a "0".

The R and I signals from encoder 22 are fed to modulator 24 as shown. The modulator comprises low pass filters 34, 36, and multipliers 38 and 40. The two signals are filtered and then multiplied by a sine and cosine signal at the carrier frequency fc. The multiplied signals are added in summer 42. The output of modulator 24 which comprises quadrature amplitude signals, are fed to a line interface circuit 44 which transfers the modulator output to a communication channel 46 via transformer 48.

Figure 4:
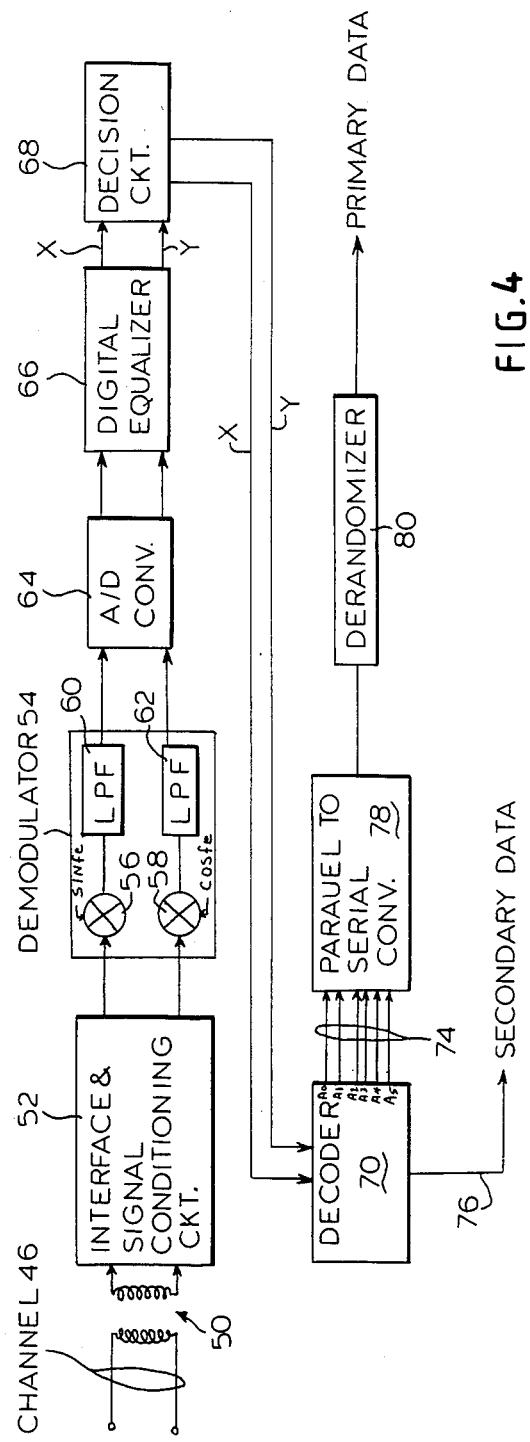
FIG. 4 shows a receiver for receiving the signals of FIG. 2.

Details of the receiver are shown in FIG. 4. Quadrature amplitude signals from channel 46 are transferred by transformer 50 to interface and signal conditioning circuits 52. From circuits 52 the incoming signals are fed to demodulator 54. In the demodulator the signals are multiplied by multipliers 56 and 58 by the sine and cosine of the carrier frequency and low pass filtered by filters 60 and 62. The filter outputs are fed to an analog-to-digital converter 64 and the output of the converter is fed to an equalizer 66. The output of the equalizer is fed to a decision circuit 68 which decides which ideal constellation point corresponds to a incoming QAM signal. The ideal constellation point is characterized by signals R and I which are identical to the output of the modulator 24 in FIG. 3. The R and I signals are fed to a decoder 70. This decoder is a 72 point decoder and is adapted to generate six primary binary signals on lines 74 and a secondary binary signal on line 76 for each received QAM signal. Of course if a received signal corresponds to point C (0,9) then no secondary output is generated on line 76. The binary signals from lines 74 are converted by a parallel-to-serial converter 78 so that its output is identical to the input of serial-to-parallel converter 26 of FIG. 3. This output is derandomized by derandomizer 80 to eliminate the effect of randomizer 20. The outputs of decoder 72 are generated in conformance with Table 1 and the signal constellation of FIG. 2.

Table 1 indicated how the signal constellation utilized by the modem is selected in accordance with the secondary channel. All four quadrants of the constellation may be identical, or alternatively, an asymmetric constellation may be used with one of the quadrants having one point corresponding to positions A, B or C of FIG. 2 and the remaining quadrants having a point only at position C. In another embodiment of the invention, a point would be selected in either side of an axis in accordance with the secondary channel. In other words, position C is used with no secondary data, position A is selected for a "1" on the secondary channel and position D (i.e., 9, −1) is used for a "0" on the secondary channel. Of course, in this latter embodiment, only one or at most two of the quadrants are modified.

Having thus described the invention, what is claimed is:

1. A method of adding a secondary channel to a QAM signal mapped in the complex plane with data points assuming normal positions on concentric rings comprising the steps of:

(a) locating a pair of positions in the mapped complex plane (A and B) which are equi-distant from the origin and no farther from the origin than the distance from the origin to a selected data point;

(b) assigning a binary "1" to the existence of a data point at one of said pair of positions and a binary "0" to the existence of a data point at the other of said pair of positions;

(c) shifting said selected data point from a mapped normal positions to define said secondary channel, the other data points being kept at their normal positions.

2. The method in accordance with claim 1 wherein said selected data point normal position comprises a position no closer to the origin than any other normal data point position.

3. The method in accordance with claim 1 wherein said selected data point positions are on opposite sides of an axis of the complex plane.

4. The method in accordance with claim 1 wherein said selected data point positions are in the same quadrant.

5. The method of claim 1 wherein said selected data point is one of the points which are farthest from the origin.

* * * * *